May 1, 1951          L. R. INWOOD          2,550,815

FROZEN FOOD CONTAINER

Filed Feb. 17, 1947

INVENTOR.
Louis R. Inwood
BY
ATTORNEY

Patented May 1, 1951

2,550,815

UNITED STATES PATENT OFFICE 2,550,815

FROZEN FOOD CONTAINER

Louis R. Inwood, Kansas City, Mo.

Application February 17, 1947, Serial No. 729,171

1 Claim. (Cl. 220—44)

This invention relates to containers for food and particularly to a package for frozen food having for its primary aim the provision of structure for receiving such articles and adapted to maintain the same in a sealed frozen condition when the same is kept at predetermined temperatures.

The most important object of this invention is to provide a frozen food package having a pair of opposed pan-like sections, one of said sections being provided with a continuous peripheral groove or trough for receiving the outermost edge of the other pan section and a filling of liquid adapted to be frozen, thereby sealing the food contained therein against entrance of air.

Another important object of this invention is to provide a frozen food package having a pair of pan-like sections, each provided with a bottom wall and inclined side walls, said side wall of one of the sections terminating in a continuous annular trough for receiving a filling of liquid, the outermost edge of said trough being lower than the innermost edge thereof to prevent the liquid contained therein from flowing into the package.

A still further object of this invention is to provide a frozen food package having the aforesaid pan-like sections as a part thereof, which sections are crimpled to the end that when the same are disposed in mutual contacting relationship to present scalloped or roughened areas with which the ice formed by freezing the liquid in the groove may cling and thereby obviate freeing itself.

Many additional objects will be made clear or become apparent during the course of the following specification, reference being made to the accompanying drawing, wherein.

Figure 1:
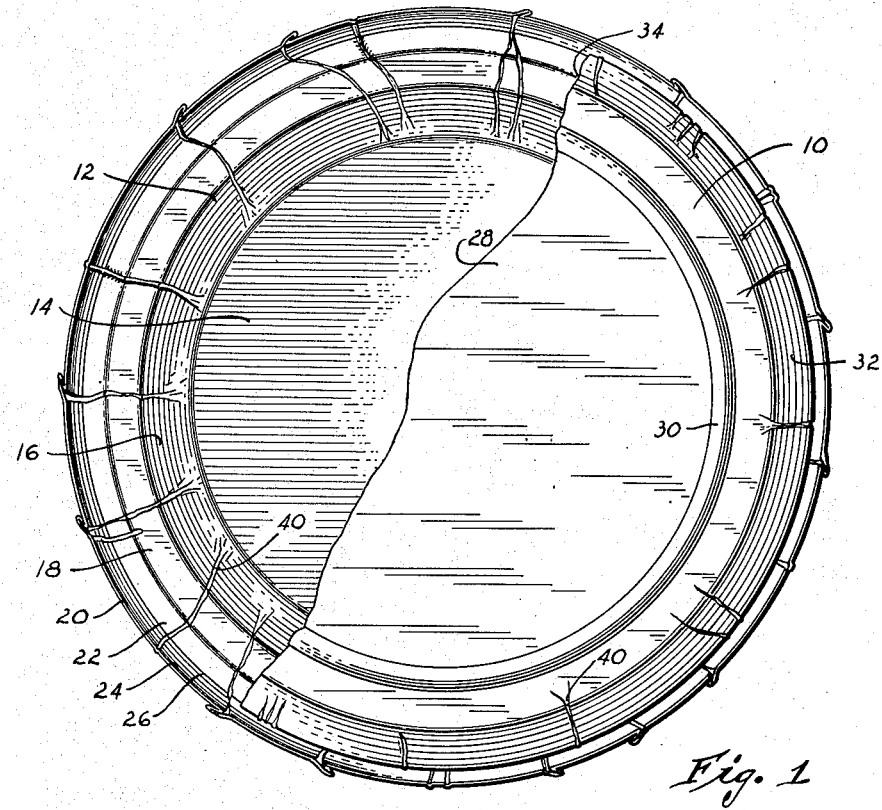
Fig. 1 is a top plan view of a frozen food package made in accordance with my present invention, parts being broken away for clearness.

A pair of opposed pan-like sections are broadly designated by the numerals 10 and 12 respectively. Section 12 is provided with a bottom wall 14 and an inclined side wall 16. That end of the flared side wall 16 remote from the bottom 14, extends outwardly as at 18 into a portion circumscribing wall 16 in substantial parallel relationship with bottom wall 14 and this section 18 terminates in a trough 20.

This trough 20, the section 18, wall 16 and bottom wall 14 of section 12, are all integral and are formed by molding the section 12 when the same is manufactured.

Trough 20 has an inner and an outer wall 22 and 24 respectively defining a continuous bight 26 circumscribing the extension 18 of wall 16.

Figure 2:
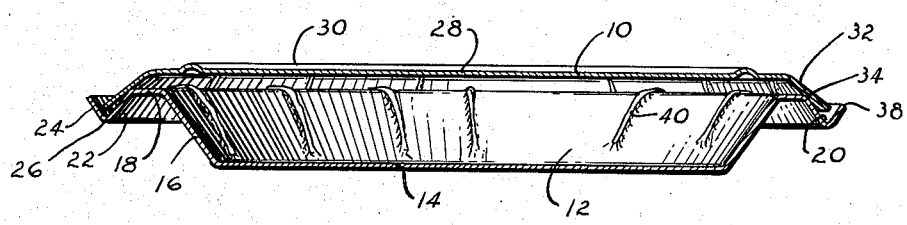
Fig. 2 is a substantially central cross sectional view taken through the package illustrated in Fig. 1.
Figure 3:
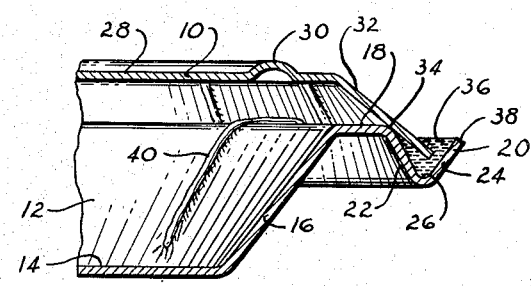
Fig. 3 is a fragmentary cross sectional view similar to that shown in Fig. 2 and on an enlarged scale.

Pan-like section 10 has a bottom wall 28 embossed as at 30 for rigidity and a continuous flared side wall 32. When in operative position, this side wall 32 of the section 10, is in engagement with the section 12 as illustrated in Figs. 2 and 3. In other words, the diameter of section 10 across side wall 32 intermediate the ends thereof is substantially the same as the diameter of section 12 at the outermost edge of the portion 18 thereof. Thus, when section 10 is moved into place, it engages portion 18 as at 34 and thereby holds bottom 28 in spaced relation from the portion 18. The outermost free marginal edge of the flared wall 32 of section 10 extends downwardly beyond point 34 into the trough or groove 20 and in spaced relation from the outermost side wall 24 of this trough 20, as clearly illustrated in Fig. 3.

When placed in operative use, the section 12 of the package is filled with food, whereupon section 10 is moved into place and a filling of liquid 36 is poured into the trough 20. This liquid 36 will not flow into the interior of the container since the outermost peripheral edge 38 of wall 24 is lower than the edge of inner wall 22 which merges with portion 18 at point 34. As the package is placed into a cooler for freezing the food contained therein, the liquid 36 is likewise frozen, thereby sealing the contents of the package against entrance of air and holding the section 10 in place. It is noted that the free end of wall 32 of section 10 beyond point 34 extends into this liquid 36 and will be frozen thereinto when such liquid 36 is changed into ice. The entire package is maintained at a low temperature while handling and until the same reaches a point of use, whereupon the entire package is placed in an oven or the like and the temperature raised to a point where the food is defrosted or thawed and rendered palatable for eating. When the package is so defrosted, vapor or moisture emanating from the liquid 36 after the same has thawed, passes into the package to prevent burning of the food and to impart moisture thereto. This action is made possible by crimpling the walls 16 and 32 of sections 12 and 10 respectively as at 40. Such crimpling presents a scalloped or roughened condition and thereby provides spaces between the sections 10 and 12 at their point of contact 34.

These spaces so presented by crimpling 40 are sealed to an air-tight condition by the freezing of liquid 36 and when the same is melted, the aforesaid vapor will pass into the container through such spaces.

An additional function of the roughened areas 40 is to present teeth which the ice formed by freezing liquid 36 engages, thereby obviating any danger of the ice freeing itself in an otherwise relatively smooth surface. This scalloping is formed by gathering the material and such material is made from a substance that has high heat conductivity such as light aluminum.

It is furthermore notable that the condition of the food within the container may be known at all times by observation of the condition of the liquid 36 within the trough 20. In other words, if this liquid 36 is frozen, the user may be assured that the contents of the package is also in a frozen condition. It is contemplated also that some types of food should not be maintained at as low a temperature as others, and, therefore, admixing the liquid 36 with a solution of brine or the like will prevent the same from freezing except at lower temperatures, thereby indicating to the user that the food is being maintained at a relatively low temperature.

It is notable that the package chosen for illustration is substantially circular and that section 12 thereof is particularly adapted to contain pies, the portion 18 thereof being provided to support the outermost edge of such pie in the usual manner. It is obvious, however, that the shape and design of the package may well be changed and portion 18 thereof entirely eliminated when other types of foods are to be contained therein. To this end the sections 10 and 12 may each be oval in shape, rectangular with rounded corners or other shapes to suit conditions and section 12 thereof might be compartmented to accommodate a number of different kinds of food.

It is also notable that section 10 presents an easily removable lid eliminating the necessity of utilizing openers or the like. Such easy removable action of lid 10 permits heating of the food with lid 10 entirely removed, if such is desired or necessary. In other words, it is clear that some types of foods should be heated or cooked without presence of steam and, therefore, during such heating or cooking process, the steam emanating from the cooking food will be free to escape.

While as above set down, it is contemplated that the trough 20 be sealed with water or other freezable liquid it is also understood that many types of foods will not require this medium. In other words, many foods need only be kept relatively cold and if the same should drop below a freezing point during handling or shipment contamination would not necessarily occur. In these instances any type of sealing agent may be substituted for the liquid 36. Such sealing agents are obtainable upon the open market and usually constitute a wax or paste-like substance, which, when disposed in the trough 20, presents a heat seal. In this case when lid 10 is moved into place and the trough 20 has a sealing of such agent, the flap or wall 24 is then crimped over the wall 32 of section 10 as heat is applied thereto for fusing the sealing agent tightly between such overlapped portions of section 10 and 12 respectively. In the event that the package is formed from aluminum or the like, to the end that same is rendered light, this sealing agent should be adapted to readily adhere to such aluminum material when heat is applied thereto during the crimping action.

In addition to being extremely inexpensive to manufacture, the package just described is easy to use and has many advantages other than those above set forth. Those advantages made possible by its use are, therefore, contemplated by this invention and manifestly, it is desired to be limited only by the spirit of this invention and scope of the appended claim.

Having thus described the invention, what is claimed as new and desired to be secured by Letters Patent is:

A container comprising a lower section having a flat bottom wall and a continuous annular side wall extending upwardly and outwardly from the periphery of said bottom wall; a continuous outwardly extending shelf on the outermost edge of said side wall in parallelism with the bottom wall; an integral annular trough depending from said shelf at the outermost edge thereof, said trough being V-shaped in cross-section, the outermost leg of the trough having its upper edge terminating in a plane between the shelf and the bottom wall; a pan-like cover section having a top wall and a continuous annular side wall extending outwardly and downwardly from the top wall in overlying relationship to the shelf and in engagement therewith at the outermost edge of the shelf, the side wall of the cover section extending into the trough with its lowermost peripheral edge spaced from said legs of the trough, said trough being adapted to receive a freezable liquid for sealing the side wall of the cover section within the trough; and crimpling formed in the sections at the point of interengagement presenting spaces interconnecting the trough and the interior of said container.

LOUIS R. INWOOD.

REFERENCES CITED

The following references are of record in the file of this patent:

UNITED STATES PATENTS

| Number | Name | Date |
|---|---|---|
| 105,572 | Heinig | July 19, 1870 |
| 804,546 | Patton et al. | Nov. 14, 1905 |
| 1,359,351 | Gash | Nov. 16, 1920 |
| 1,369,919 | Eliel | Mar. 1, 1921 |
| 1,404,113 | Gonnella | Jan. 17, 1922 |
| 1,446,782 | Brown et al. | Feb. 27, 1923 |
| 1,540,252 | Chamberlain | June 2, 1925 |

FOREIGN PATENTS

| Number | Country | Date |
|---|---|---|
| 296,010 | Germany | Jan. 5, 1917 |
| 429,226 | Great Britain | May 27, 1935 |
| 474,111 | Great Britain | Oct. 26, 1937 |